United States Patent
Chuang et al.

(10) Patent No.: US 7,038,352 B1
(45) Date of Patent: May 2, 2006

(54) STATOR DEVICE OF A MOTOR AND FABRICATION METHOD THEREOF

(75) Inventors: Chen-Jung Chuang, Taipei (TW); Ching-Min Yang, Taipei (TW); Chun-Liang Ho, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/062,814

(22) Filed: Feb. 23, 2005

(51) Int. Cl.
*H02K 1/12* (2006.01)
*H02K 3/32* (2006.01)

(52) U.S. Cl. .................. 310/254; 310/164; 310/42

(58) Field of Classification Search ............... 310/254, 310/259, 257, 258, 256, 216
See application file for complete search history.

(56) References Cited

U.S. PATENT DOCUMENTS

| | | | | |
|---|---|---|---|---|
| 1,812,748 A | * | 6/1931 | Kayser | ............ 310/258 |
| 3,495,107 A | * | 2/1970 | Haydon | ............ 310/49 R |
| 5,859,487 A | * | 1/1999 | Chen | ............ 310/254 |
| 5,917,262 A | * | 6/1999 | Huang et al. | ............ 310/254 |
| 6,409,197 B1 | * | 6/2002 | Endo et al. | ............ 280/288.4 |
| 6,853,101 B1 | * | 2/2005 | Lin et al. | ............ 310/49 R |
| 2004/0041495 A1 | * | 3/2004 | Suzuki et al. | ............ 310/259 |
| 2005/0046287 A1 | * | 3/2005 | Huang et al. | ............ 310/67 R |

* cited by examiner

*Primary Examiner*—Darren Schuberg
*Assistant Examiner*—Erik Preston

(57) ABSTRACT

A stator device in a motor includes a magnetism guiding part, a magnetizing part, a coil seat, a circuit board and a support part. The magnetism guiding part has a split opening straightly extending along the length thereof and a projection is provided at a specific spot of the circumferential edges of the central through holes of the magnetizing part, the coil seat and the circuit board respectively to engage with the split opening. A stem extends upward from the support part to fit with the inner wall surface of the magnetism guiding part.

1 Claim, 7 Drawing Sheets

US 7,038,352 B1

STATOR DEVICE OF A MOTOR AND FABRICATION METHOD THEREOF

BACKGROUND OF THE INVENTION

1. Field of the Invention

The present invention is related to a stator device of a motor and fabrication method thereof and particularly to a joining structure of a magnetism guiding part in the stator device.

2. Brief Description of the Related Art

Referring to FIGS. 1 and 2, a conventional stator device of a motor includes a magnetism guiding part 11, a magnetizing part 12, a coil 13, a circuit board 14 and a support 15. The coil 13 is wound on the coil seat 131 and the magnetizing part 12 is composed of an upper electrode plate 121 and a lower electrode plate 122. The magnetism guiding part 11, the upper electrode plate 121, the lower electrode plate 122, the coil 131 and the circuit board 14 are provided with a through hole (111, 121a, 122a, 131a and 141) respectively and the magnetism guiding part 11 is joined to the through holes (121a, 122a, 131a and 141) and fits with a through hole 151 of the support part 15.

When the preceding stator device is set up, the magnetism guiding part 11 joined to the upper electrode plate 121, the coil seat 131, the lower electrode plate 122, the circuit board 14 and the support part 15 sequentially by way of being joined to the through holes (121a, 122a, 131a, 141 and 151) respectively. The coil seat 131 is disposed between the upper electrode plate 121 and the lower electrode plate 122 in a way of the circumferential side of the upper electrode plate 121 being alternate to the circumferential side of the lower electrode plate 122.

However, the conventional stator device has the following shortcomings:

(1) It is required for the magnetism-guiding cylinder 11 to tightly fit with the through holes (121a, 122a, 131a, 141 and 151) such that it is incapable of being fixed accurately in case of no locating holes 121b at the upper electrode plate 121 and locating holes 122b, 122c at the lower electrode plate 122 being provided and no locating projections 131b on the coil seat 131 corresponding to the locating holes 121b, 122b and locating projections 142 on the circuit board corresponding to the locating holes 122c being provided. The upper electrode plate 121 and the lower electrode plate 122 can be located in a way of alternating to each other due to the locating holes 121b, 122b fitting with the locating projections 131b and the circuit board is located accurately due to the locating holes 122c fitting with the locating projections 142. In the meantime, a sensor 143 attached to the circuit board 14 can be disposed to pair with the upper and lower electrode plates 121, 122 once the circuit board is accurately located. However, it is often that the locating projections 131b detach from the locating holes 121b, 122b and, normally, it is more inconvenient to attach the locating projections 131b to the locating holes 121b, 122b.

(2) The magnetism-guiding cylinder 11 is hollow so that and it is easy to occur eddy current loss.

(3) The locating holes 121b of the upper electrode plate 121 and locating holes 122b and 122c of the lower electrode plate 122 are easy to occur flux loss.

SUMMARY OF THE INVENTION

An object of the present invention is to provide a stator device of a motor for lessening eddy current loss.

Another object of the present invention is to provide a stator device of a motor, which is assembled conveniently.

A further object of the present invention is to provide a stator device of a motor with which the parts thereof are capable of being accurately located quickly.

A further object of the present invention is to provide a stator device of a motor with which the flux loss is capable of being lessened.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
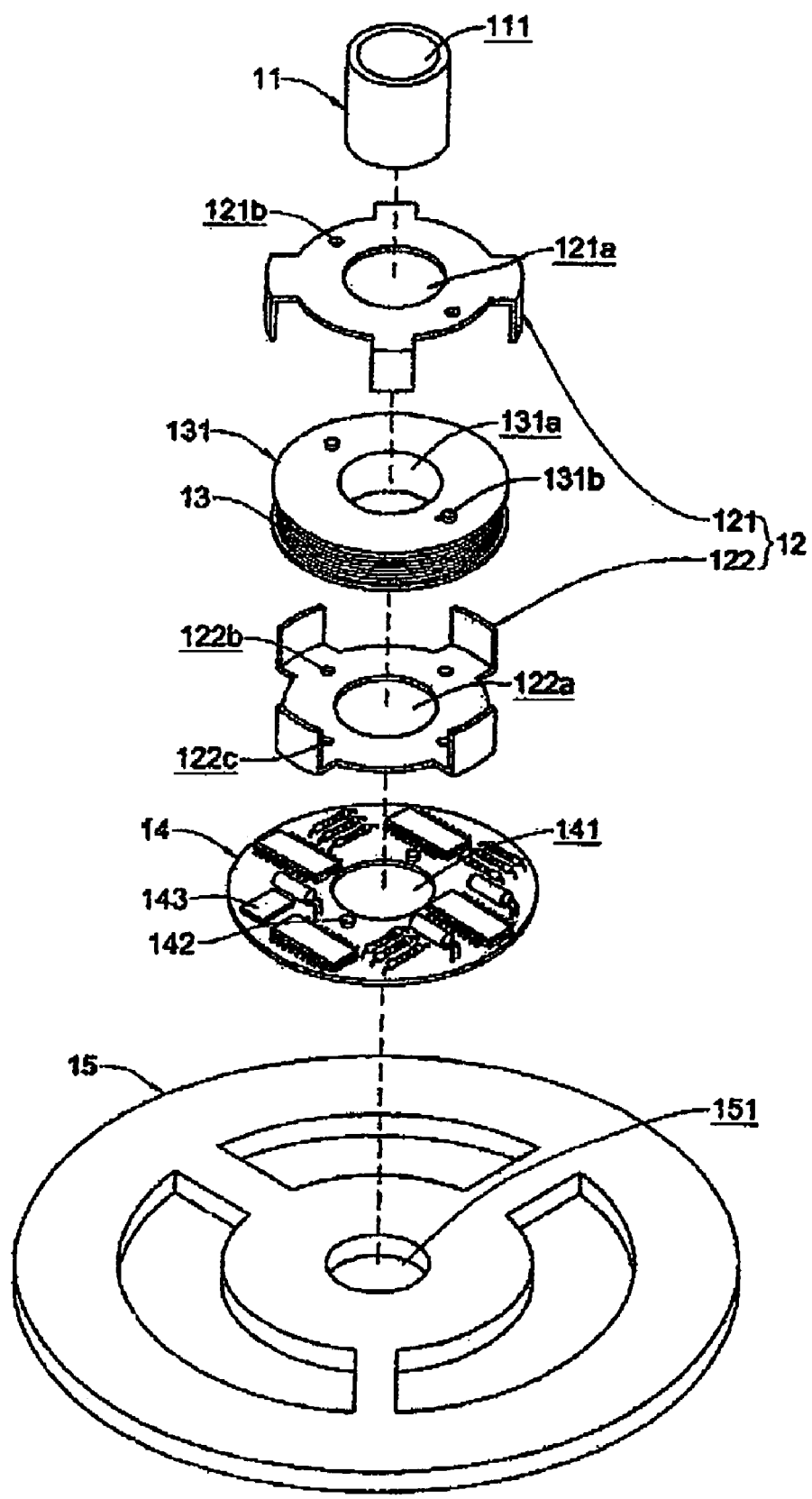
FIG. 1 is an exploded perspective view of the conventional stator device in a motor.
Figure 2:
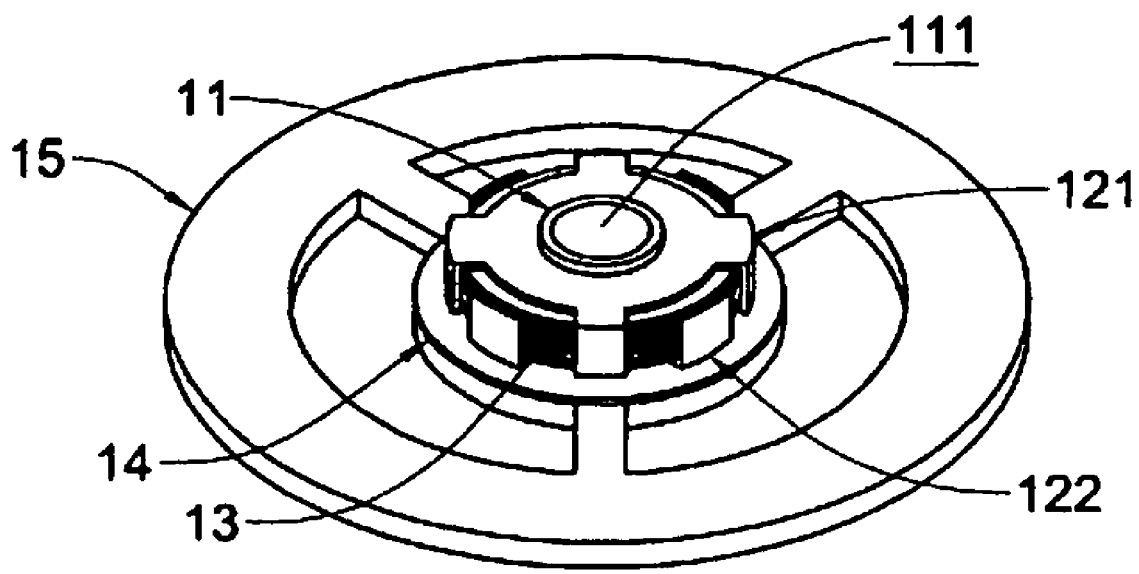
FIG. 2 is an assembled perspective view of the conventional stator device in a motor.
Figure 3:
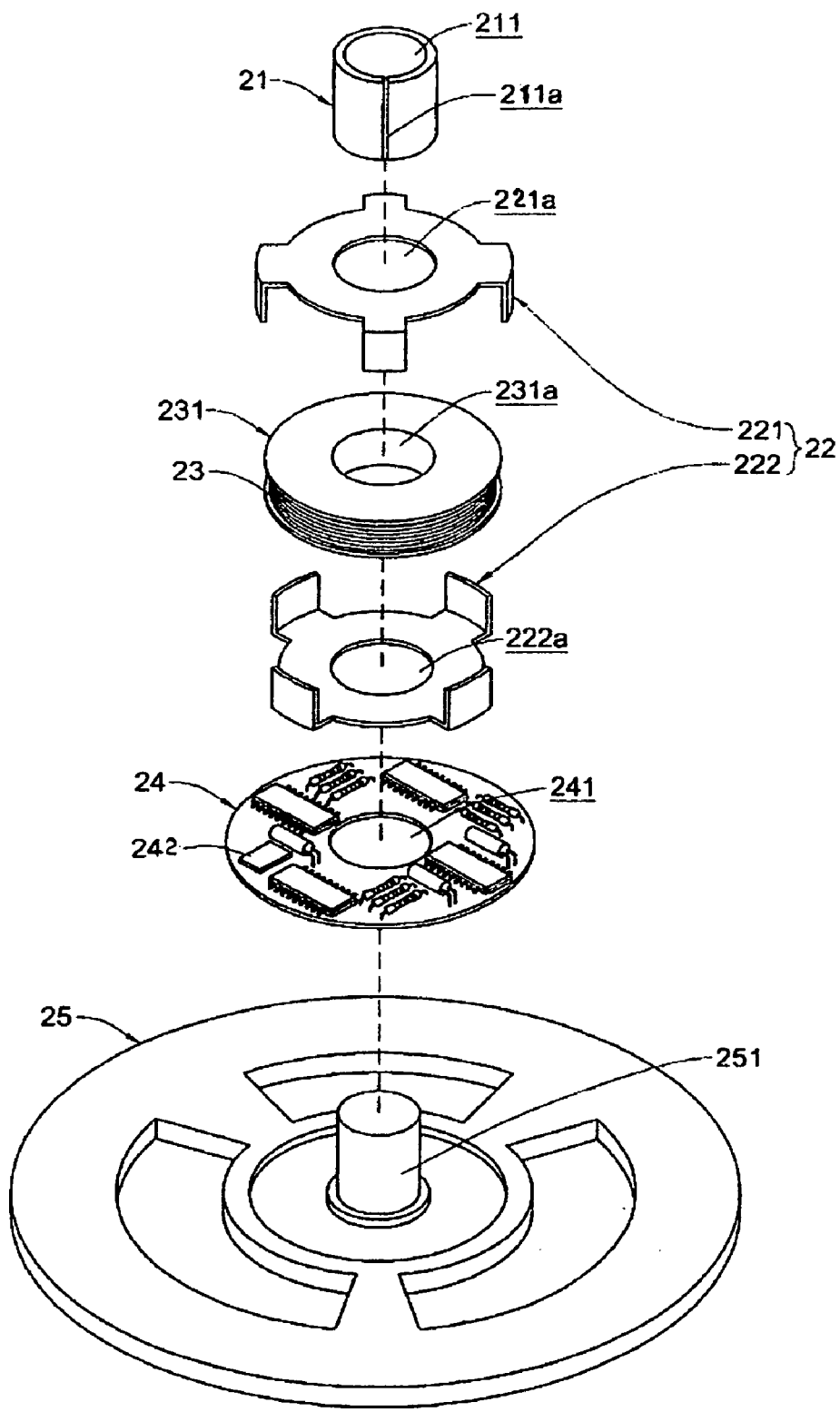
FIG. 3 is an exploded perspective view of the first embodiment of a stator device in a motor according to the present invention.
Figure 4:
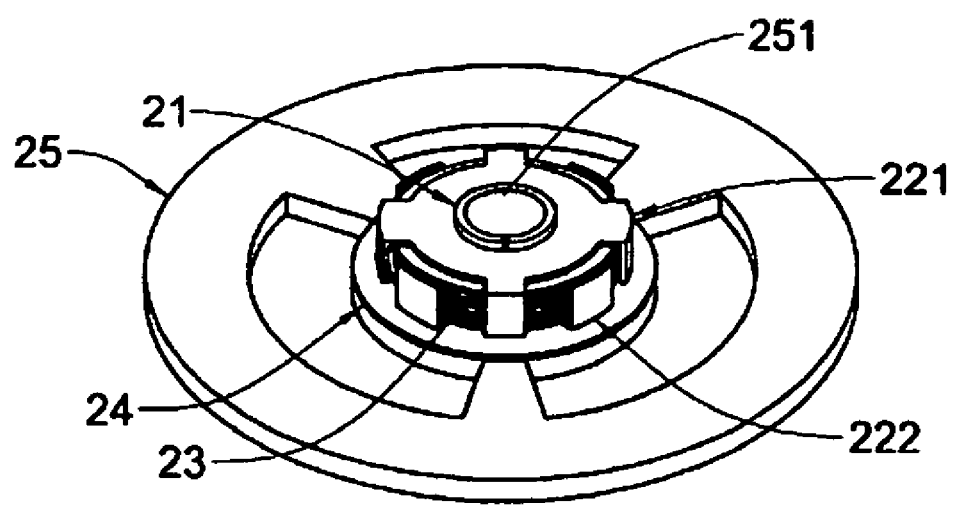
FIG. 4 is an assembled perspective view of the first embodiment of a stator device in a motor according to the present invention.
Figures 5, 6:
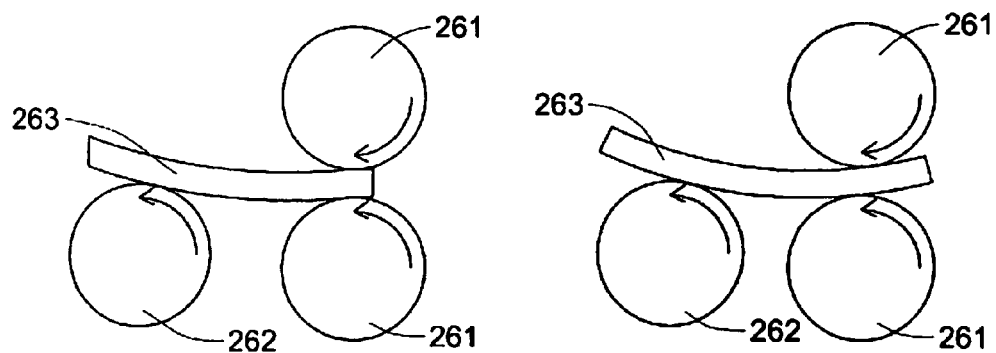
FIG. 5 is a plan view illustrating the first process of the guide magnetic part in the stator device of the present invention being worked.
FIG. 6 is a plan view illustrating the second process of the guide magnetic part in the stator device of the present invention being worked.
Figures 7, 8:
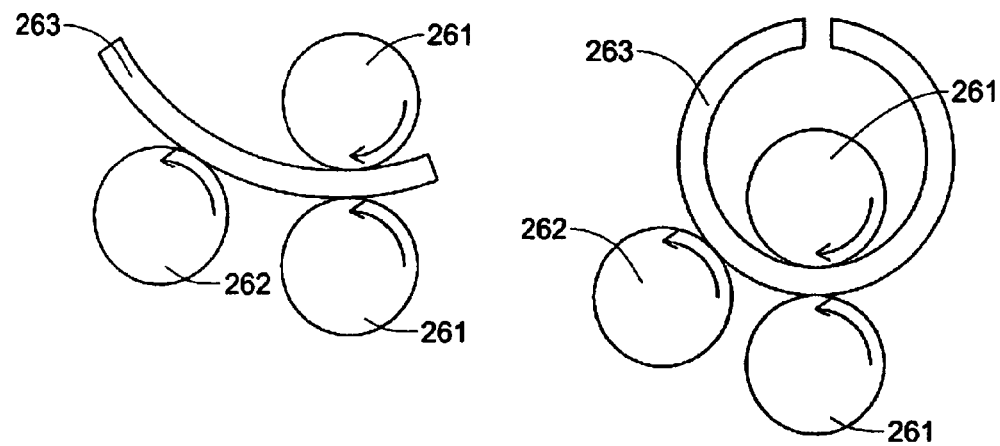
FIG. 7 is a plan view illustrating the third process of the guide magnetic part in the stator device of the present invention being worked.
FIG. 8 is a plan view illustrating the fourth process of the guide magnetic part in the stator device of the present invention being worked.

Referring to FIGS. 3 and 4, the first embodiment of a stator device in a motor according to the present invention is illustrated. The stator device in the first embodiment of the present invention comprises a magnetism guiding part 21, a magnetizing part 22, a coil 23, a circuit board 24 and a support part 25. The coil 23 is wound on a coil seat 231 and the magnetizing part 22 is composed of an upper electrode plate 221 and a lower electrode plate 222. The magnetism guiding part 21, the upper electrode plate 221, the lower electrode plate 222, the coil 231 and the circuit board 24 are provided with a through hole (211, 221a, 222a, 231a and 241) respectively and the magnetism guiding part 21 has a split opening 211a. The magnetism guiding part 21 passes through the through holes (221a, 222a, 231a and 241) and fits with a stem 251 projecting from the support part 25.

When the stator device of the present invention is set up, the magnetism guiding part 21 is joined to the upper electrode plate 221, the coil seat 231, the lower electrode plate 222 and the circuit board 24 sequentially by way of passing through the through holes (221a, 222a, 231a and 241) respectively. The coil seat 231 is disposed between the upper electrode plate 221 and the lower electrode plate 222 in a way of the circumferential side of the upper electrode plate 221 being alternate to the circumferential side of the lower electrode plate 222. Further, a sensor 242 on the circuit board 24 is disposed between the upper electrode plate 221 and the lower electrode plate 222 so as to pair with the upper and lower electrode plates (221, 222). Finally, the through hole 211 of the magnetism guiding part 21 is joined to the stem 251 of the support part 25. It is advantageous that the stator device of the present invention is capable of avoiding eddy current loss.

Figure 9:
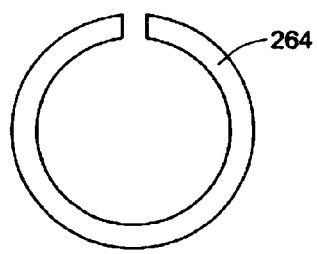
FIG. 9 is a plan view of the finished guide magnetic part used in the stator device of the present invention.

Referring to FIGS. 5, 6, 7, 8 and 9, the preferred embodiment of a fabrication device of the magnetism guiding part is illustrated and the fabrication device includes at least two locating mechanisms 261 such as rolls, at least two forming mechanisms 262 such as rolls and a plate member 263 made of magnetism guiding material. The plate member 263 is held and fed by the locating mechanisms 261 till the plate member 283 touching the forming mechanisms 262. The plate member 262 is bent and wrapped by the forming mechanisms 262 continuously till a cylinder 264 with a split opening is formed as shown in FIG. 9.

Figure 10:
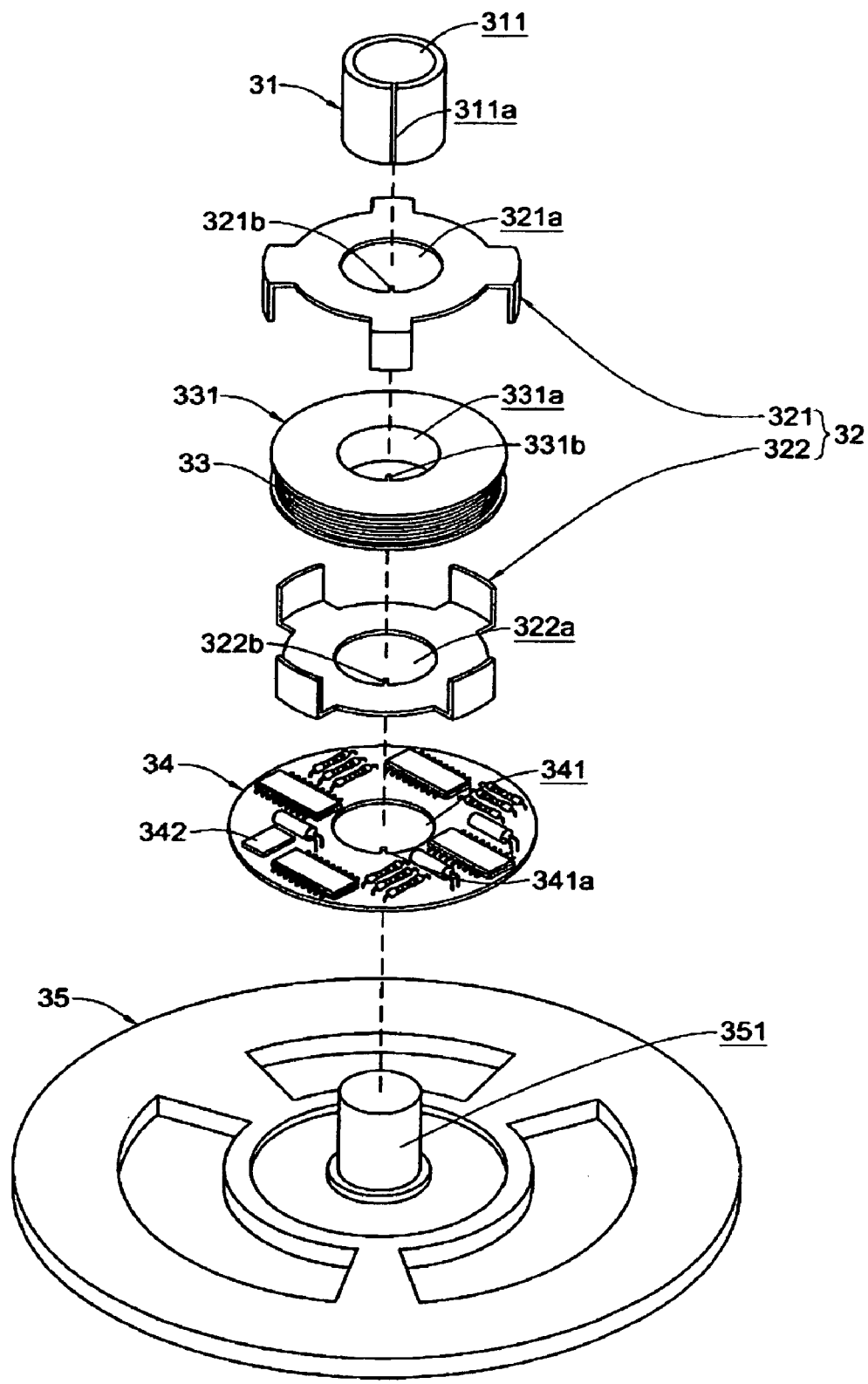
FIG. 10 is an exploded perspective view of the second embodiment of a stator device in a motor according to the present invention.
Figure 11:
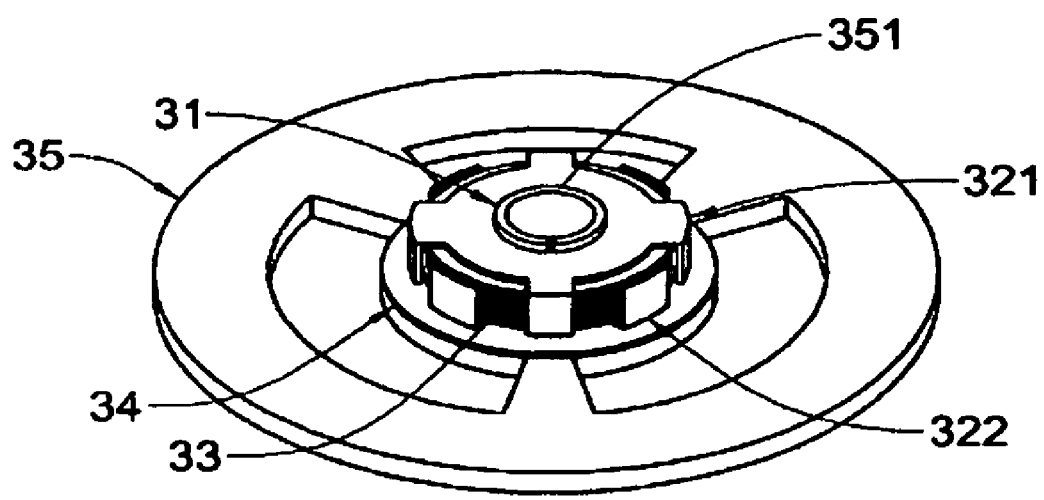
FIG. 11 is an assembled perspective view of the second embodiment of the present invention.

Referring to FIGS. 10 and 11, the second preferred embodiment of a stator device in a motor according to the present invention is illustrated. The stator device in the second embodiment of the present invention comprises a magnetism guiding part 31, a magnetizing part 32, a coil 33, a circuit board 34 and a support part 35. The coil 33 is wound on a coil seat 331 and the magnetizing part 32 is composed of an upper electrode plate 321 and a lower electrode plate 322. The magnetism guiding part 31, the upper electrode plate 321, the lower electrode plate 322, the coil 331 and the circuit board 34 are provided with a through hole (311, 321a, 322a, 331a and 341) respectively and the magnetism guiding part 31 has a split opening 311a. The magnetism guiding part 21 passes through the through holes (321a, 322a, 331a and 341) and fits with a stem 351 projecting from the support part 35.

Wall surfaces of both the through holes 321a, 322a in the upper electrode 321 and the lower electrode 322 have a projection (321b, 322b) respectively. The wall surfaces of the through holes 331a and 341a in the coil seat 331 and the circuit board 34 have a projection (331b, 341a) respectively. Hence, the projections 321b, 322b, 331b, 341a are inserted into the split opening 311a of the magnetism guiding part 31.

When the preceding second embodiment of the stator device in a motor is set up, the magnetism guiding part 31 joined to the upper electrode plate 321, the coil seat 331, the lower electrode plate 322 and the circuit board 34 sequentially by way of passing through the through holes (321a, 322a, 331a and 341) respectively and the split opening 311a of the magnetism guiding part 31 engaging with the projections 321b, 331b, 322b, 341a. The coil seat 331 is disposed between the upper electrode plate 321 and the lower electrode plate 322 in a way of the circumferential side of the upper electrode plate 321 being alternate to the circumferential side of the lower electrode plate 322. Further, a sensor 342 on the circuit board 34 is disposed between the upper electrode plate 321 and the lower electrode plate 322 so as to pair with the upper and lower electrode plates (321, 322). Finally, the through hole 311 of the magnetism guiding part 31 is joined to the stem 351 of the support part 35. It is advantageous that the stator device of the present invention is capable of avoiding eddy current loss and magnetic flux decrease and obtaining effect of fast locating and convenient assembling.

As the forgoing, the stator device in a motor according to the present invention has the following advantages:
1. The split opening 311a of the magnetism guiding part 31 engages with the projections (321b, 331b, 322b, 341a) at the through holes (321a, 331a, 322a, 341) of the upper plates 321, the coil seat 331, the lower plates 322 and the circuit board 34 respectively so that not only effect of fast locating and not easily releasing can be obtained but also convenient assembling and magnetic flux decrease can be reached.
2. The split opening (211a, 311a) of the magnetism guiding part 21, 31 is capable of preventing eddy current loss.

While the invention has been described with referencing to preferred embodiments thereof, it is to be understood that modifications or variations may be easily made without departing from the spirit of this invention, which is defined by the appended claims.

What is claimed is:
1. A stator in a motor, comprising:
a magnetism guiding part, being a hollow cylinder with an inner wall surface;
a magnetizing part, having an upper electrode plate and a lower electrode plate, which are disposed to be opposite to each other, the upper electrode plate providing a first central through hole and the lower electrode providing a second central through hole being passed through with the magnetism guiding part;
a coil seat with a third central through hole, being disposed between and enclosed by the upper electrode plate and the lower electrode plate, being wound with a coil and the third central through hole being passed through with the magnetism guiding part;
a circuit board with a fourth central through hole, being disposed under the magnetizing part and the fourth central through hole being passed with the magnetism guiding part; and
a support part, having a shape of disk to be joined to the magnetism guiding part;
characterized in that the magnetism guiding part has a split opening straightly extending along the length thereof and a projection is provided at a specific spot of the circumferential edges of the first, second, third and fourth central through hole respectively to engage with the split opening and a stem extending upward to fit with the inner fitting surface of the magnetism guiding part for fitting with the inner wall of the magnetism guiding part.

* * * * *